R. HENRY.
BEET PULLER.
APPLICATION FILED JULY 15, 1915.
1,160,405.
Patented Nov. 16, 1915.
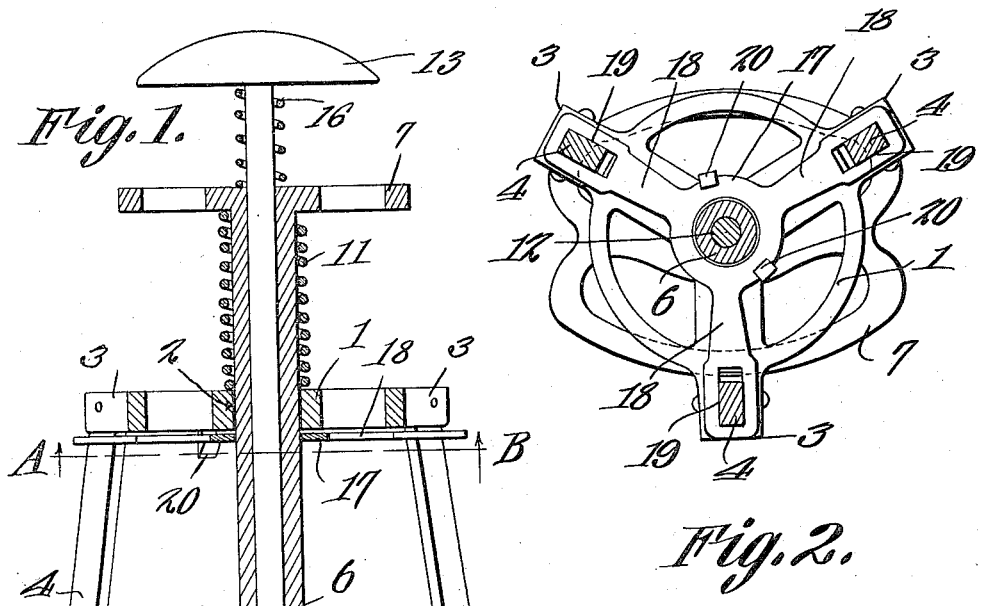
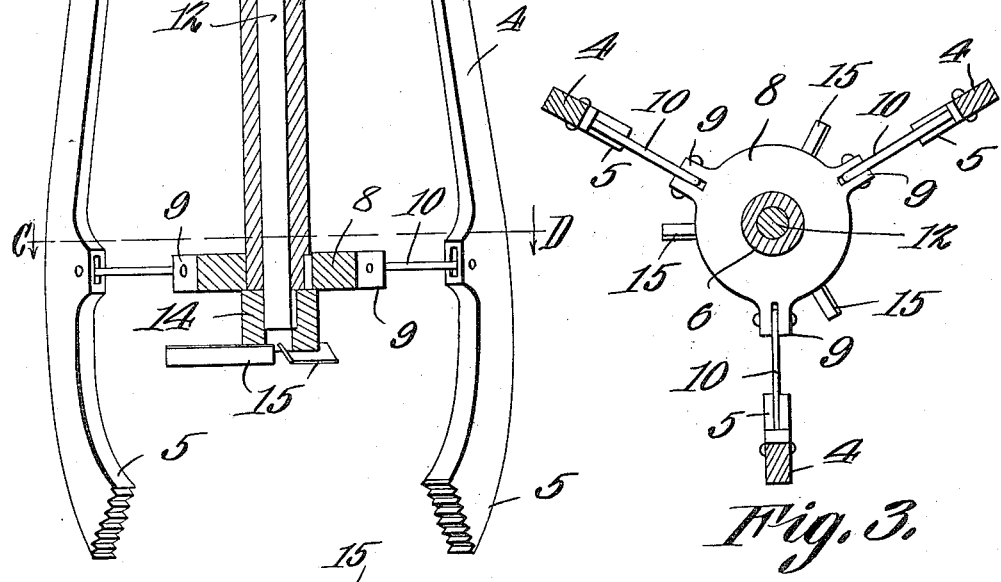
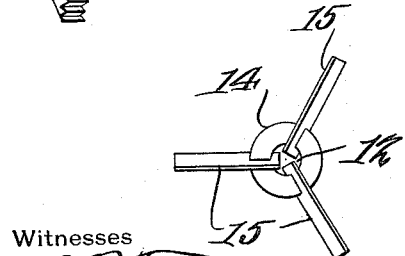
Robert Henry, Inventor,
by C. A. Snow & Co., Attorneys.
Witnesses

UNITED STATES PATENT OFFICE.

ROBERT HENRY, OF BLUE LAKE, CALIFORNIA.

BEET-PULLER.

1,160,405.

Specification of Letters Patent.

Patented Nov. 16, 1915.

Application filed July 15, 1915. Serial No. 40,054.

*To all whom it may concern:*

Be it known that I, ROBERT HENRY, a citizen of the United States, residing at Blue Lake, in the county of Humboldt and State of California, have invented a new and useful Beet-Puller, of which the following is a specification.

This invention relates to a device for pulling beets, one of the objects of the invention being to provide means whereby a beet can be tightly gripped and, while gripped, its tops cut off, after which the beet can be lifted from the ground.

A further object is to provide means whereby the beet gripping elements can be held in engagement with the beet.

A further object is to provide a device of this character which can be easily carried from place to place.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings: Figure 1 is a central vertical section through the device, the jaws being shown spread apart. Fig. 2 is a section on line A—B Fig. 1. Fig. 3 is a section on line C—D Fig. 1. Fig. 4 is a bottom plan view of the cutter.

Referring to the figures by characters of reference 1 designates a head having a central opening 2 and radially extending ears 3. Pivotally connected to each of the ears is an arm 4 provided, at its free end, with a jaw 5 preferably toothed as shown.

Slidably mounted within the opening 2 is a tubular stem 6 provided, at its upper end, with a handle 7, while its lower end has a collar 8 from which radiate ears 9. These ears are connected to the arms 4 by toggle links 10. A coiled spring 11 is mounted on the stem 6 and between head 1 and handle 7 and serves to hold the handle normally pressed upwardly away from the head and the arms 4 normally drawn inwardly toward each other. In Fig. 1 the parts have been shown in the positions assumed thereby when the stem 6 is pressed downwardly and the arms 4 swung apart.

A rod 12 is mounted for rotation in stem 6 and is provided, at its upper end, with a handle 13 whereby it can be rotated while its lower end has a collar 14 disposed below the collar 8 and having radially disposed cutting blades 15 extending from the ends thereof. A spring 16 is mounted on that portion of the rod above the handle 7 and bears at one end against said handle and at its other end against the handle 13. Thus collar 14 is held normally pressed against the collar 8.

Slidably mounted on the stem 6 is a ring 17 having radial arms 18 provided with openings 19 through which the arms 4 extend loosely. Opposed spring catches 20 depend from the head 1 and are adapted to engage ring 17 and hold it against the head as shown in Fig. 1. When it is desired to fasten the arms 4 when moved inwardly toward each other, the catches 20 are swung out of engagement with ring 17 and said ring permitted to gravitate along the stem 6. The arms 18 will thus ride along the arms 4 and hold them with their jaws pressed toward each other in gripping positions.

In using the device, the arms 4 are swung apart by moving the stem 6 downwardly through the opening 2, thus to cause links 10 to thrust against the arms 4. The jaws 5 are then forced into the ground so as to be positioned about the beet to be pulled and while they are in this position the rod 12 is thrust downwardly by means of handle 13 and against the action of spring 16 so as to bring the blades 15 against the top of the beet. By then rotating handle 13, the tops will be cut off of the beet. After the tops have been removed, the operator pulls upwardly on handle 7. This movement is assisted by the spring 11 and causes the collar 8 to pull through links 10 upon arms 4 with the result that the jaws 5 are pressed into engagement with the beet. By pulling upwardly on handle 7 after the jaws have come into engagement with the beet, the beet will be extracted from the ground, it being understood that the greater the pull exerted on the handle 7, the more tightly the jaws will bite into the beet. Where some difficulty is experienced in removing the beet, the catches 20 can be disengaged from ring 17 so that said ring will gravitate to its lowermost position, the arms 18 holding the jaws in engagement with the beet.

What is claimed is:—

1. A beet puller including beet gripping elements pivotally mounted, a stem slidable relative thereto, a toggle connection between the stem and said elements, a handle upon the stem, said handle and stem being movable upwardly relative to said elements to shift the elements inwardly to grip upon the beet.

2. A beet puller including a head, beet engaging arms pivotally connected thereto, a stem slidably mounted in the head, toggle connections between the stem and arms, and a handle upon the stem, said handle and stem being movable upwardly to shift the arms inwardly to gripping positions.

3. A beet puller including a head, beet engaging arms pivotally connected thereto, a stem slidably mounted in the head, toggle connections between the stem and arms, a handle upon the stem, said handle and stem being movable upwardly to shift the arms inwardly to gripping positions, and means slidably mounted on the stem for holding the arms in gripping positions.

4. A beet puller including a head, beet engaging arms pivotally connected thereto, a stem slidably mounted in the head, toggle connections between the stem and arms, a handle upon the stem, said handle and stem being movable upwardly to shift the arms inwardly to gripping positions, means slidably mounted on the stem for holding the arms in gripping positions, and fastening devices for holding said means in inactive position.

5. A beet puller including pivotally mounted beet engaging arms, a stem slidably mounted therein, toggle connections between the stem and arms, said stem being movable upwardly to draw the arms inwardly toward each other, a cutting element below the stem, and means extending through the stem for rotating said element.

6. A beet puller including pivotally mounted beet engaging arms, a stem slidably mounted therein, toggle connections between the stem and arms, said stem being movable upwardly to draw the arms inwardly toward each other, a cutting element below the stem, and yieldingly supported means extending through the stem for rotating said element.

In testimony that I claim the foregoing as my own, I have hereto affixed my signature in the presence of two witnesses.

ROBERT HENRY.

Witnesses:
MARY JANE HENRY,
KENNETH N. DEWAR.

Copies of this patent may be obtained for five cents each, by addressing the "Commissioner of Patents, Washington, D. C."